April 13, 1926.

C. SANG 1,580,683

POTATO CLEANING AND SACKING MACHINE

Filed March 17, 1920    2 Sheets-Sheet 1

INVENTOR
Charlie Sang.
BY Charles E Townsend
ATTORNEY.

April 13, 1926. 1,580,683
C. SANG
POTATO CLEANING AND SACKING MACHINE
Filed March 17, 1920 2 Sheets-Sheet 2
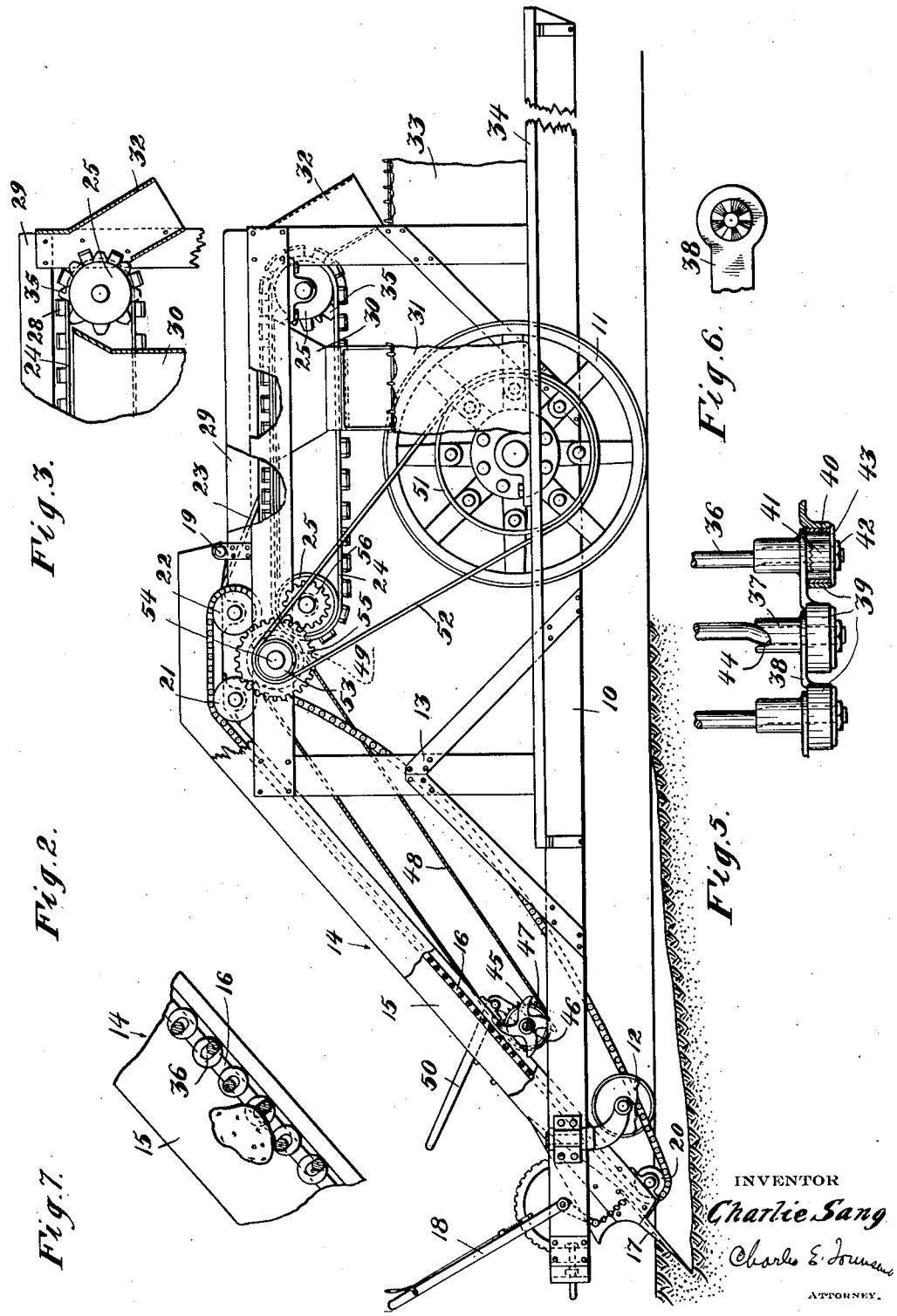
INVENTOR
Charlie Sang
Charles E. Townsend
ATTORNEY.

Patented Apr. 13, 1926.

1,580,683

UNITED STATES PATENT OFFICE.

CHARLIE SANG, OF CASTROVILLE, CALIFORNIA.

POTATO CLEANING AND SACKING MACHINE.

Application filed March 17, 1920. Serial No. 366,678.

*To all whom it may concern:*

Be it known that I, CHARLIE SANG, a citizen of China, residing at Castroville, in the county of Monterey and State of California, have invented new and useful Improvements in Potato Cleaning and Sacking Machines, of which the following is a specification.

This invention relates to an agricultural implement, and particularly pertains to a potato cleaning and sacking machine.

The principal object of the present invention is to provide a device which may be drawn through a field and will act to dig potatoes, elevating them and permitting them to be readily cleaned and sacked as the digging operation progresses, all of which action is brought about by simple means not liable to require repair and which will act with certainty at all times.

The present invention contemplates the use of a main frame supported upon a suitable running gear at the forward end of which is a digging tool adapted to elevate potatoes and the surrounding soil on to a conveyor, by which they are delivered to a cleaning and sorting table and from which they are conveyed to sacks.

The invention is illustrated by way of example in the accompanying drawings, in which—

Fig. 2 is a view in side elevation showing the machine with parts broken away to more clearly disclose its construction.

Fig. 3 is a fragmentary view in vertical section through an ejector adapted to prevent potatoes from clogging the conveyor chains.

Fig. 5 is a fragmentary view in section and elevation showing the conveyor belt.

Fig. 6 is a detail of one of the belt links.

Fig. 7 is a fragmentary view in section through the belt showing the staggered relation of the rods and the manner in which potatoes may be lodged thereupon.

Figure 1:
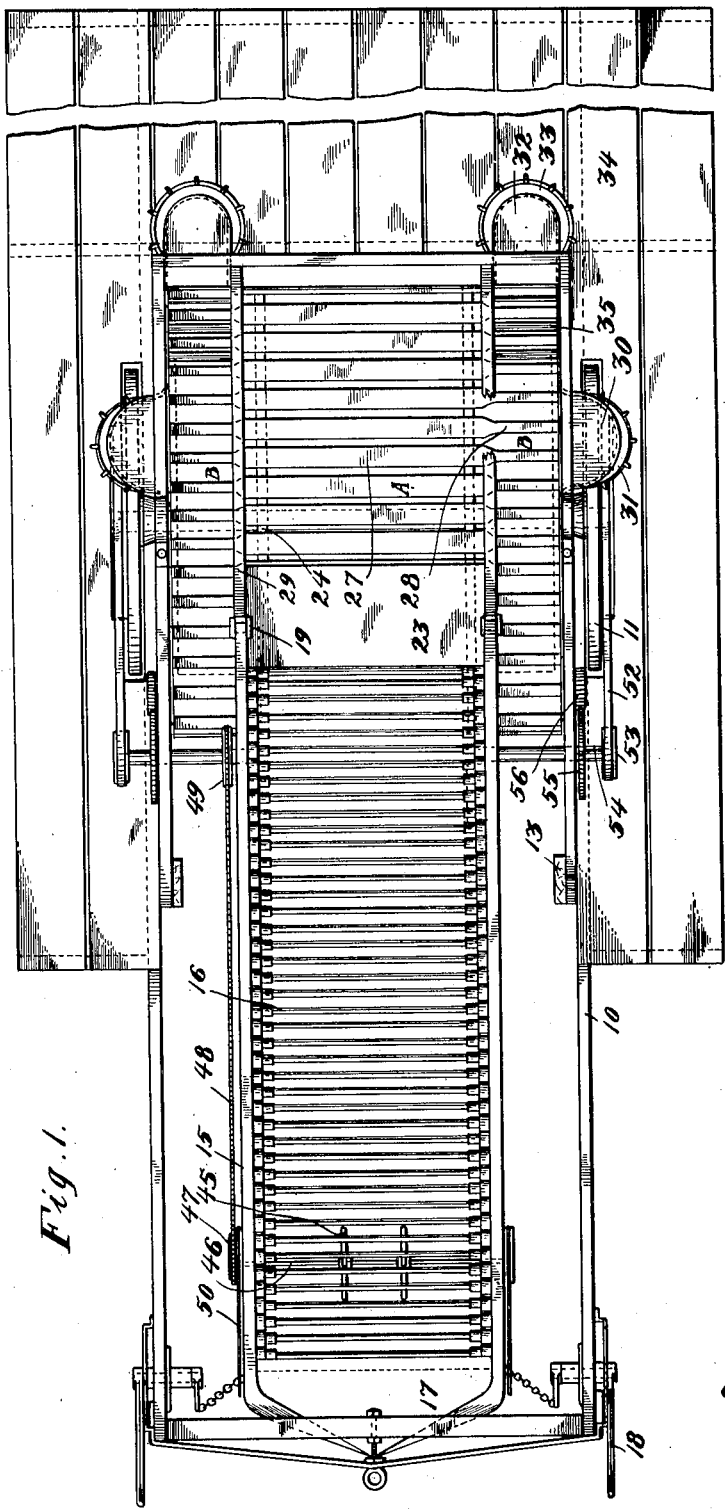
Fig. 1 is an enlarged view in plan showing the complete machine.

Referring more particularly to the drawings, 10 indicates a main frame supported near its rear by wheels 11 and at its front end by caster wheels 12. Mounted upon this main frame is a superstructure 13 carrying the power transmission mechanism and the conveyors with which the present invention is concerned. Extending downwardly and forwardly from the superstructure is an elevating conveyor 14 which consists of side rails 15, between which a conveyor chain 16 is mounted. The lower end of the conveyor construction serves as a mounting for a potato digger 17 which is adapted to penetrate the ground as regulated by an adjusting lever 18 acting to swing the conveyor structure from a pivot shaft 19 on the superstructure. The lower end of the conveyor frame carries pulley wheels or drums 20 around which the conveyor belt 16 may pass, while the upper end is fitted with idler pulleys 21 and an end pulley 22 around which the conveyor chain may pass. These pulleys are spaced from each other in the same horizontal plane, and this will carry the material horizontally and deposit it upon an inclined runway 23.

The runway 23 overhangs a sorting belt 24. This belt passes around a pair of horizontally spaced drums 25. The exact construction of the belt is more clearly shown in Fig. 1, where it will be seen to be composed of slats 27 having reduced end lengths 28 and enlarged intermediate sections, thus providing large passageways between the end lengths of the slat and small passageways between the intermediate portion. The top of the superstructure is divided longitudinally into a central table portion A, and side portions B. The division is made by continuations 29 of the rails 15. These rails extend above the sorting belt and along the line at which reduction in the diameters of the slats is produced. This will insure that the potatoes and soil will be dumped on to the central table portion A and the soil may thereafter sift through the narrow passageways between the slats, after which the potatoes may be manually removed and deposited on the side table portions B to be separated and graded. This grading operation will cause the smaller potatoes to fall through the openings between the slats and be conveyed through hoppers 30 to sacks 31. The large potatoes will be carried along the belt and will pass through hoppers 32 into sacks 33. The sacks are mounted upon a running board 34 which is designed to accommodate the sacks and the necessary workmen.

Figure 4:
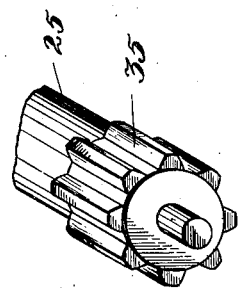
Fig. 4 is a fragmentary view in perspective showing the ejector.

Referring particularly to Figs. 3 and 4, it will be seen that the ends of the roller 25 have been formed in the shape of elongated gears, as indicated at 35. The teeth of these gears are adapted to extend between the reduced end portions 28 of the slats and will act to eject undersized potatoes which have lodged between the slats and which would be crushed as the sorting belt passes around the rollers. This automatically insures that the belt will be cleared of all the potatoes and that the potatoes which could not pass through the hopper 30 into the sack 31 will all be passed into the sacks 33.

The conveyor chain 15 is particularly shown in Figs. 5, 6 and 7. It will be seen to comprise a plurality of cross bars 36 which have oppositely bent ends, causing their body portions to lie in staggered relation to each other. This will make a series of pockets throughout the length of the belt and will insure that the potatoes and dirt thrown on to the belt will be lodged and conveyed therewith. The ends of the rods are provided with fittings 37 having extending shanks 38. These shanks carry a bearing housing 39 for a complementary fitting 37, as shown in Fig. 5. The bearing housing accommodates a set of roller bearings 40 which are adapted to roll around a removable bushing 41. The bushing is serrated on one face and is intended to register with complementary serrations on the end of the member 37, thus making it possible for the nut 42 to clamp the bushing in position, while covering the end of the bearing by washer 43. At the same time it will be seen that the nut will hold the entire fitting in position and will prevent rotation of the bars 36, due to the recessed seat 44 with which each fitting is formed.

In order to prevent the belt 16 from becoming clogged, star wheels 45 are mounted upon a shaft 46 beneath the upper run of the belt and are adapted to strike against the cross bars. These wheels are driven by a suitable sprocket wheel 47, around which a sprocket chain 48 is led to a driving sprocket 49. The intensity of the blow delivered by the arms of the star wheels may be regulated by an adjusting lever 50 to swing the wheels toward or away from the chain.

Driving power for the various mechanism is derived from a pulley 51 carried upon one of the wheels 11 of the running gear. This pulley receives a belt 52 which leads around a small driven pulley 53 mounted on a transmission shaft 54. This shaft carries a gear 55 in constant mesh with a second gear 56. The gear 56 is secured to the shaft of the forward sorting belt drum 25. The chain 16 is driven by means of sprockets carried upon the shaft 54 and over which the lower run of the chain passes. In this manner it will be seen that advanced movement of the implement will cause all of the belts and chains to be set in motion and the operation to be carried out.

In the operation of the present invention, workmen stand upon the side running boards 34 and the implement is drawn by a suitable traction means. As the digger 17 penetrates the soil it will throw the soil and potatoes upon the upwardly moving chain 16, from which it will be conveyed to the runway 23 and delivered to the table portion A of the sorting belt. The workmen will then manually clean the potatoes and drop them on to the side portions B of the belt, where they will be automatically sorted. The large potatoes will remain upon the top of the belt and the small potatoes will fall between the slats and will find their way into the sacks 31. Any intermediate sized potatoes which might wedge between the slats will be ejected by the action of the gear 35.

It will thus be seen that by operation of the present implement potatoes may be readily dug, cleaned and sacked in a rapid and convenient manner.

While I have shown the preferred form of my invention as now known to me, I wish it understood that various changes in the construction, combination and arrangement of parts may be made by those skilled in the art without departing from the spirit of the invention as claimed.

Having thus described my invention, what I claim and desire to secure by Letters Patent is:—

1. In a device of the character described, a wheeled frame, a conveyor structure mounted on the frame, including side members and an endless belt operating between the side members and composed of interconnected, staggered, transversely extended bars to form transverse pockets from side to side and throughout the length of the endless belt, a star wheel mounted between the runs of the belt and adapted to engage the upper run of the belt for disintegrating the material carried by the upper run of the conveyor, and a lever mounted on one of the side members and having operative connection with the star wheel to adjust the latter with relation to the belt.

2. In a device of the character described, a wheeled frame, a conveyor structure mounted on the frame including side members, and an endless belt operating between the side members and composed of staggered, transversely extended bars, bearing members in which the bars are mounted, and connecting members each having a housing embracing one bearing member and having an arm connecting the adjacet bearing member whereby to interconnect the bars and whereby to provide transverse pockets from side to side and throughout the length of the endless belt.

In testimony whereof I have hereunto set my hand.

CHARLIE SANG.